June 1, 1965     C. W. SCHOENDUBE     3,187,232
TIME DELAY CONTROL SYSTEM

Filed Dec. 27, 1961     2 Sheets-Sheet 1

Inventor,
Charles W. Schoendube,
by Gilbert P. Tarleton
His Attorney.

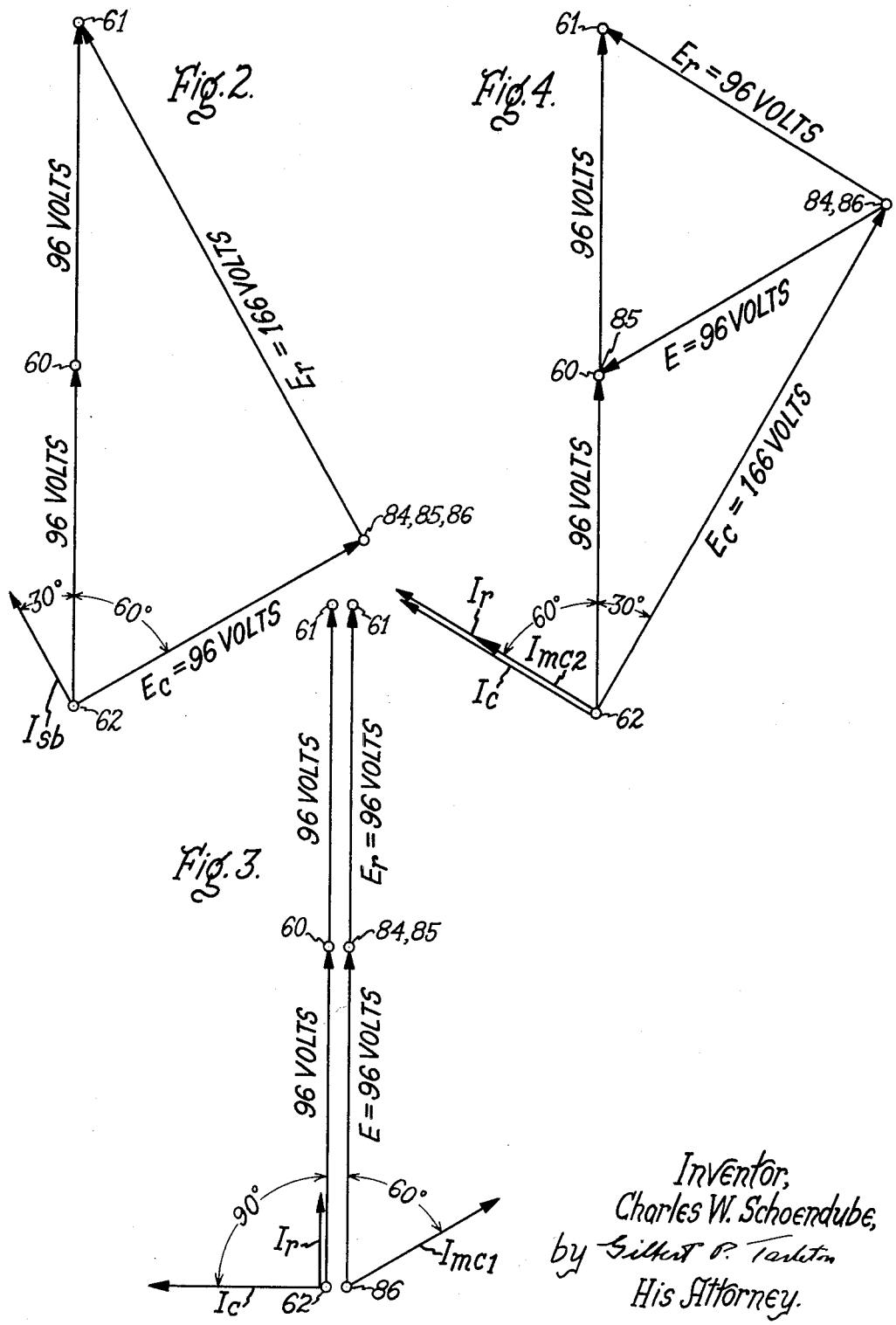

United States Patent Office 3,187,232
Patented June 1, 1965

3,187,232
TIME DELAY CONTROL SYSTEM
Charles W. Schoendube, Lee, Mass., assignor to General Electric Company, a corporation of New York
Filed Dec. 27, 1961, Ser. No. 162,451
6 Claims. (Cl. 317—141)

This invention relates to time delay systems, and more particularly to time delay control systems employing a reversely movable member, such as a motor.

Step-type switching mechanisms are widely used in connection with voltage regulators in which a voltage is adjusted by stepping a contact member from one voltage tap to another. In order to prevent unnecessary operation of the voltage regulating mechanism under rapidly fluctuating load conditions, it has been customary for many years to provide a time delay means between the primary control device and the regulator proper. Lennox Patent 2,779,899, which is assigned to the same assignee as the present invention, illustrates a time delay control system operating on resonant principles in use prior to the present invention. The control system disclosed in the Lennox patent employs a first capacitor in series between the transformer secondary winding and the control motor winding energized when the voltage regulating relay is closed, and a second capacitor in parallel with the control motor winding which is energized to return the system to neutral when the voltage regulating relay opens. Although this system has been used satisfactorily for many years to control step voltage regulators, the system has several disadvantages. For example, to provide safety features, such as grounding the exposed parts on the voltage regulating relay, a full transformer having an isolated secondary winding should be employed. Furthermore, the transformer must have a higher than desirable volt-ampere rating.

I have discovered an improved time delay control circuit in which a single capacitor serves the functions performed by both capacitors in the Lennox patent; the circuitry is such that an autotransformer can be employed safely, and the volt-ampere rating of the transformer can be reduced to one-third the previously required value. This results in an increase in the reliability of the control system, together with reductions in the size, weight, and cost of the apparatus.

Accordingly, it is an object of my invention to provide improved time delay control systems.

Another object is to provide a reversible motor time delay control system of increased reliability and lower cost.

A further object of my invention is to provide a time delay system for controlling a member moved in reverse directions by inductor means, the system including only one resistor-capacitor network that produces both series and parallel resonance with the inductor means.

A further object of my invention is to provide a time delay control system employing an autotransformer of relatively low volt-ampere rating.

Another object is to increase the safety of time delay control systems energized by a voltage regulating relay and having autotransformer supplying input voltage by providing a circuit in which one terminal of the autotransformer and parts of the voltage regulating relay can be grounded.

Other objects and advantages of the invention will be apparent from the drawing, specification, and claims, and the scope of the invention will be pointed out in the claims.

Briefly stated, in accordance with one aspect of my invention, a time delay control system may comprise voltage supply means having a tap connection on its output side, and a time delay relay having a motor provided with inductor windings for operating the motor in reverse directions. Each winding may have an operating circuit through a normally closed contact, and an auxiliary circuit which operates through the voltage supply tap connection. A capacitor and a resistor are common both to the operating circuits and to the auxiliary circuits. A voltage regulating relay has contacts that selectively operate to complete one of the operating circuits, and the circuit elements are correlated so that the circuits are tuned in parallel to run the motor through the operating circuits and tuned in series to operate the motor through the auxiliary circuits. A set of main control contacts are provided with the time delay relay, and the main control contacts are actuated by the time delay relay motor after a predetermined time of rotation in either direction.

In the drawing:

FIG. 2 is a vector diagram showing the relationships between voltages and currents in the time delay control circuit of FIG. 1 when the voltage regulating relay has not been actuated.

FIG. 3 is a vector diagram showing the relationships between voltages and currents in the time delay control circuit of FIG. 1 when a contact on the voltage regulating relay is closed.

FIG. 4 is a vector diagram showing the relationships between voltages and currents in the time delay control circuit of FIG. 1 when the motor is being returned to its neutral position.

Figure 1:
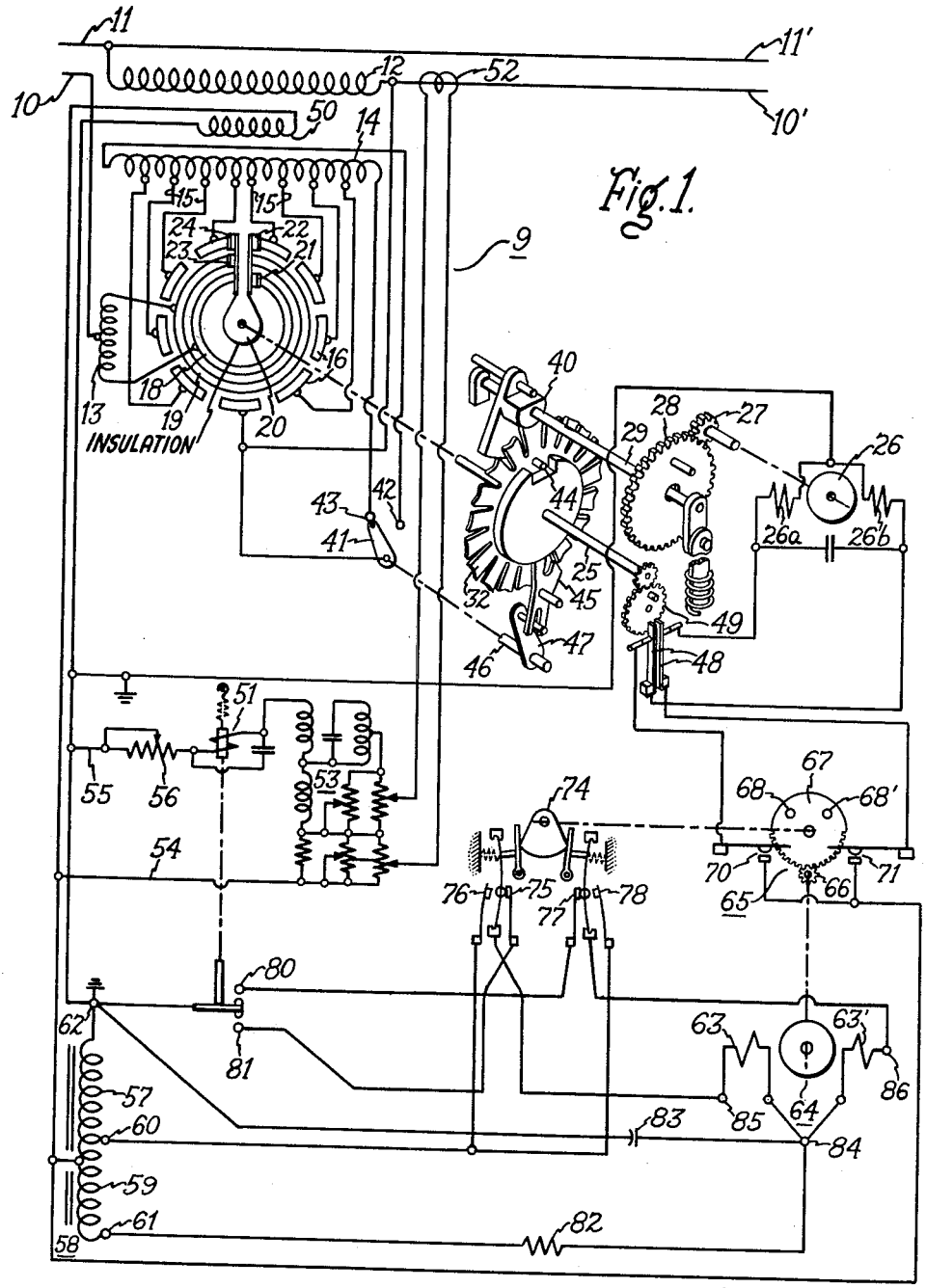
FIG. 1 is a diagrammatic view of step voltage regulator apparatus incorporating an embodiment of a time delay control system in accord with my teachings.

FIG. 1 shows a pair of power lines 10 and 11 which provide incoming power and lines 10' and 11', which furnish power on the load side of a step-type voltage regulator 9. The power line 11 is connected to one end of a shunt winding 12 of the regulator 9 in a manner well known in the art. The power line 10 is connected to the mid-tap of a switching reactor 13 through which it is connected to the series winding 14 of the voltage regulator in a manner to be more fully explained hereinafter. The load line 11' is connected to the line 11 at the point where the line 11 is connected to the shunt winding 12 and is in effect a continuation of the line 11. The line 10' is connected to the line 10 through the series winding 14 of the voltage regulator. The series winding 14 is provided with a plurality of taps 15 each of which is connected to a single one of a plurality of circumferentially arranged conducting segments 16. The two ends of the switching reactor 13 are connected respectively to concentric conducting rings 18 and 19 which are positioned radially inwardly of the conducting segment 16. A rotatable insulated contact arm 20 is pivotally mounted at the center of a circle defined by the conducting rings 18 and 19 and by the conducting segments 16.

In order to maintain electrical contact between the lower end of the switching reactor 13, with respect to the view shown in FIG. 1, and the contact segments 16, the contact arm 20 is provided at its right-hand edge, with respect to the view shown in FIG. 1, with a pair of contact brushes 21 and 22 which are conductively connected together. The contact 21 maintains contact with the radially inner conducting ring 18 while the contact 22 maintains contacts with the conducting segments 16 which are connected to the taps 15 of the series winding 14. Thus, the lower end of the switching reactor 13 is connected through the inner conducting ring 18, contacts 21 and 22, conducting segments 16, and taps 15 to the series winding 14.

In order to provide electrical contact between the upper end of the switching reactor 13, with respect to the view shown in FIG. 1, and the contact segments 16, the left-hand edge of the contact arm 20 is provided with a pair of contact members 23 and 24 which are conductively connected together and respectively maintain contact with the outer conducting ring 19 and the contact segments 16.

Thus, the upper end of the switching reactor 13 is connected to the series winding 14 through the conducting ring 19, contacts 23 and 24, conducting segments 16, and taps 15. The contacts 21 and 22 carried by the contact arm 20 are insulated from the contacts 23 and 24.

When the position of the contact arm 20 is such that the contact arm 20 and contacts 21, 22, 23, and 24 are in contact with only a single one of the conducting segments 16, the respective contacts 21, 22, 23, and 24 are all at the same electrical potentials, since they are short-circuited by the particular conducting segments 16 with which the contact arm 20 is in alignment.

In this case, the current divides between the two halves of the switching reactor 13, the two halves of the winding being in parallel electrical relation with each other. However, if the position on the contact arm 20 is such that it bridges a pair of adjacent conducting segments 16, as shown in FIG. 1, then each end of the switching reactor 13 is connected across a different tap of the series winding 14. When this occurs, the switching reactor 13 acts as an autotransformer and the voltage derived is half-way between the voltages of the adjacent taps to which the respective opposite ends of the switching reactor 13 are connected.

The switching arm 20 is driven by a shaft 25 which is actuated by a spring-driven Geneva gear mechanism which will now be described.

A motor 26 drives a pinion 27 which engages a gear 28 mounted on a shaft 29 on one end of which is mounted a Geneva gear driver 40 which is in driving engagement with a Geneva gear 32 mounted upon the same shaft 25 as the switching arm 20 whereby rotation of the Geneva gear rotates the switching arm 20 in unison.

Included in the illustrated embodiment is an arrangement for reversing the polarity connections of the series winding 14 when the switch arm 20 passes through its neutral position. For this purpose, a reversing switch 41 is provided in series with the line 10′. The reversing switch 41 is movable into engagement with either of contacts 42 and 43, these contacts being connected to opposite ends of the series winding 14. A pin member 44 is attached to the Geneva gear 32 in a position such that as Geneva gear 32 passes through the neutral position corresponding to the position at which the switch 41 should be moved from contact 42 to contact 43 or vice versa, the pin 44 engages the slot in a segment 45 of the Geneva gear 32 and causes a rapid motion of a reversing shaft 46 upon which is fixedly mounted a link 47 connected to the segment 45. Since the switch 41 is also mounted upon the shaft 46, the motion of the shaft 46 causes the switch member 41 to move from the contact 42 to the contact 43 and vice versa.

The direction of rotation of the motor 26 depends upon which of its windings 26a and 26b is energized. The energizing circuit for each of the windings 26a and 26b passes through a limit switch 48 actuated by a pin 49 carried by a gear which makes one complete revolution for every two complete revolutions of the shaft 25. The limit switch 48 prevents the rotation of the switch arm 20 from going too far in either direction.

A power winding 50 inductively coupled to the shunt winding 12 supplies power for operating my time delay control system except for a voltage regulating relay 51, which is arranged to be energized on small differences in voltage from a current transformer 52 through a conventional variable control network 53 which is also connected to the power winding 50 by means of conductors 54 and 55 and variable resistor 56. The voltage regulating relay may be any conventional type, as for example that described in Champlin Patent 2,077,212. In such relays it is desirable for safety reasons to ground the contact beam, as indicated at 62 in FIG. 1.

The step voltage regulator 9 with its control gearing, and the voltage regulating relay 51 and its control network described in the preceding paragraphs are conventional in all respects. My novel time delay control system for actuating the motor 26 will now be described in detail.

A voltage from the power winding 50 may be impressed upon the common winding 57 of an autotransformer 58, and the autotransformer 58 may have a series winding 59. An interior tap 60 is provided at a predetermined location on the output side of the autotransformer; in the illustrated embodiment the potential at the tap 60 should be midway beween that at terminals 61 and 62 for reasons given in paragraphs that follow. Voltage from the transformer 58 is used to operate a first inductor winding 63 and a second inductor winding 63′ of a reversely movable member, such as a motor 64 which is an element of a time delay relay 65. The motor 64 rotates a pinion 66 which in turn rotates a gear 67 having a pair of knobs 68 and 68′ protruding therefrom which selectively engage contact arms which close contacts 70 and 71 to complete circuits through the limit switch 48 for the energization of the winding 26a and 26b of the motor 26. The contacts 70 and 71 close only after the gear 67 has rotated for a time interval of the order of 30 seconds. A cam element 74 of the time delay relay 65 rotates in unison with the gear 67 in a conventional manner, so that when the gear 67 is rotated, the cam 74 will either open a contact 75 and close a contact 76 or open a contact 77 and close a contact 78; energization of the motor winding 63 affects the contacts 77 and 78 and energization of the motor winding 63′ affects the contacts 75 and 76.

With the gear 67 in its neutral position, as illustrated in FIG. 1, the initial energization of the operating windings 63 and 63′ of the motor 64 takes place from the terminal 62 of the autotransformer 58 through contact 80 or 81 of the voltage regulating relay 51, the normally closed contacts 75 or 77 of the time delay relay 65, the windings 63 or 63′, a resistor 82, and back to the terminal 61 of the autotransformer 58. The two circuits thus described are the main operating circuits of the motor windings 63 and 63′, and the particular circuit selected depends upon which of the contacts 80 and 81 is closed. A capacitor 83 will be in parallel with the winding 63 or 63′ in the main operating circuit between a circuit junction point 84 and terminal 62.

Auxiliary circuits for run-back energization of the windings 63 and 63′ of the motor 64 are provided by a circuit in which a winding 63 or 63′ is connected between the tap 60 of the autotransformer output windings and the junction point 84. In the auxiliary circuits the resistor 82 and capacitor 83 are in series across the autotransformer output windings, and the junction point 84 occurs between the resistor 82 and capacitor 83.

In a preferred embodiment the time delay control circuit operates at 120 volts and 60 cycles at the terminals of winding 50. The operating coil 63′ advances the setting of the voltage regulator 9 and the operating coil 63 lowers this setting. When the motor 64 has operated for a predetermined time, the output contacts 70 or 71, depending upon which direction the motor was turned, close to connect the regulator motor 26 to the source of power through limit switch 48. Immediately upon the start of a timing cycle either the contact 78 or the contact 76 closes and remains closed until the relay 65 has returned to the neutral position illustrated.

Upon actuation of the voltage regulating relay 51, the time delay system operates with a predetermined operating voltage on the appropriate winding, for example 63, of the time delay relay 65 and with substantially no voltage on the other winding (63′) when the contact 81 is closed, regardless of whether contact 78 is open or closed. Thereafter upon deactuation of the voltage regulating relay 51 with both contacts 80 and 81 open, the same predetermined operating voltage will be imposed for run-back on the winding 63′ if the contact 78 is closed, in which case the contact 77 will be open. These conditions will be obtained provided the circuit elements described have the correct values of resistance, capacitance, and voltage as hereinafter specified.

The coils 63 and 63' are mounted on the stationary magnetic structure of the time delay relay motor and are highly inductive. When alternating voltage is applied to one of them, the resulting current will lag the voltage by some angle $\phi$, so that cos $\phi$ represents the power factor of the current. If the impedance of each winding 63 or 63' is Z, the resistance in the resistor 82 is equal to $$\frac{Z}{1-\cos\phi}$$

and the capacitance of capacitor 83 will equal $$\frac{\sin\phi}{2\pi f Z}$$

If the predetermined voltage required for operation of the windings 63 or 63' equals E, the output winding of the autotransformer will be wound so that the voltage difference between the interior tap 60 and the terminal 62 is E, and so that the voltage difference between the interior tap 60 and the terminal 61 is $$\frac{E\cos\phi}{1-\cos\phi}$$

Although it is well within the province of those skilled in the art to design circuit elements correlated to provide the desired operation, the following quantities are given as typical of a particular installation. Those skilled in the art will appreciate that other correlated quantities may be readily determined.

$E$=96 volts
Cos $\phi$=.5
$Z$=1500 ohms
Resistor 82=3000 ohms
Capacitor 83=approximately 1.5 microfarads
Voltage between taps 60 and 61=96 volts
Voltage between taps 60 and 62=96 volts The above correlated arrangement is such that a winding 63 or 63' will be resonant when in parallel with the capacitor 83 in the main operating circuits, and resonant when a winding 63 or 63' is serially connected between the tap 60 and junction 84 of the resistor 82 and capacitor 83 in the auxiliary circuits. For example, when the contact 80 of the voltage regulating relay 51 closes, the resistor 82 will be in series with the parallel resonant capacitor 83 and winding 63', and thus the circuit will act as if all elements were pure resistance; the equivalent resistance for parallel resonant capacitor 82 and winding is such that the junction 84 between the windings 63, 63' and resistor 82 is at the same potential as the interior tap 60. Thus, no voltage appears between the junction 84 and tap 60. When the operation of the time delay relay 65 in response to energization of the winding 63' causes the closing of the contact 76, no voltage is applied to the winding 63, since it is then connected between the junction 84 and tap 60. Thus, the relay continues to run forward by means of the winding 63' until the motor 26 is energized. When the balancing of the voltage regulating relay 51 causes contact 80 to open again, the contact 76 remains closed, and the condition described above no longer exists. At this time, contacts 80 and 81 are both open, and winding 63 is connected between tap 60 and junction 84, which is now located between capacitor 83 and the resistor 82, which are connected in series between terminals 61 and 62. Because of the resonance of the capacitor 83 and the winding 63 between the terminals 60 and 84, the resulting impedances are such that the predetermined operating voltage appears across the winding 63, and the relay runs back to its neutral position under full power, whereupon the contact 76 opens de-energizing the winding 63. No voltage is applied to the winding 63' because the contacts 80 and 78 are both open. A comparable action to that described above takes place when the contact 81 closes to complete an initial main operating circuit through the winding 63.

The above relationships between the voltages in the operating and auxiliary circuits can be better understood by reference to the vector diagrams in FIGS. 2–4. The points at the vector ends are given the same numbers used in FIG. 1 for the points connected to circuit elements across which the voltages appear, and the magnitudes of the voltages are given for a circuit with elements having the values given in the aforementioned illustrative example. FIG. 2 shows the relationships when contacts 80 and 81 are both open before actuation of the voltage regulating relay 51. A flow of "standby" current $I_{sb}$ through the resistor 82 and capacitor 83 when the contacts 80 and 81 are open produces the voltage drop $E_r$ across the resistor 82 and $E_c$ across the capacitor 83.

FIG. 3 shows the relationships when one voltage regulating relay (e.g. 80) is closed and the motor 64 is rotating so as to close a contact 70. The voltage drop E across the parallel-resonant motor coil 63' and capacitor 83, which are between the points 86 and 84, is shown to be 96 volts, which is equal to the predetermined timer motor operating voltage, and the voltage drop $E_r$ across the resistor 82 is also 96 volts. The other motor coil 63 is not energized because it is connected through contact 76 between junction 84 and tap 60, which are both at the same potential of 96 volts. The currents through resistor 82 ($I_r$), capacitor 83 ($I_c$), and motor coil 63' ($I_{mc1}$) are shown.

FIG. 4 shows the relationships after de-energization of the voltage regulating relay causes the contact 80 to open and the motor is running back to its neutral position. The voltage E across the run back coil 63 is 96 volts, which is equal to the predetermined voltage necessary for proper operation of the motor 64. It is noteworthy that the current $I_c$, $I_r$, and $I_{mc2}$ (the current through the run back motor coil) are in phase when an auxiliary circuit is in operation.

While the present invention has been described with reference to particular embodiments thereof, it will be understood that the time delay control system may be applied to apparatus other than step voltage regulators and that numerous modifications may be made by those skilled in the art without actually departing from the invention. For example, the autotransformer 58 could be arranged to step-down rather than step-up voltage and conventional spark-suppression elements could be employed if needed. Therefore, I aim in the appended claims to cover all such equivalent variations as come within the true spirit and scope of the foregoing disclosure.

What I claim as new and desire to secure by Letters Patent of the United States is:

1. In a time delay control system:
   (A) voltage supply means having a pair of output terminals and a tap at a potential intermediate that at said output terminals,
   (B) a time delay relay having a main control contacts for energization of an external circuit and a member movable from a neutral position in first and second reverse directions,
      (a) said main control contacts being actuated by said member after a predetermined time of movement in either direction from said neutral position,
      (b) first and second inductor means respectively causing movement of said member in said first and second reverse directions when a predetermined operating voltage is applied thereto,
      (c) a normally closed contact in series with one end of each inductor means,
      (d) a normally open contact also in series with said one end of each inductor means,
   (C) a pair of relay energizing contacts for selectively connecting said one end of each inductor means to one of said output terminals through their associated normally closed contacts,
- (a) means associated with said member operative to open the normally closed contact and close the normally open contact associated with one inductor means upon energization of the other inductor means by a relay energizing contact,
- (b) circuit means connecting said tap to said one end of each inductor means when its associated normally open contact is closed, (D) a circuit junction,
- (a) capacitance means connected between said one output terminal and said circuit junction,
- (b) resistance means connected between the other output terminal and said circuit junction, and
- (c) the other end of each inductor means being connected to said circuit junction, (E) an operating circuit comprising
- (a) one inductor means connected in parallel with said capacitance means between said circuit junction and said one terminal when its associated relay energizing contact and normally closed contact are both closed,
- (b) and the parallel-connected capacitance and inductor means being connected to the other output terminal through said resistance means,
- (c) thereby to cause said member to move away from its neutral position in one direction to close a main operating contact, (F) an auxiliary runback circuit comprising
- (a) the other inductor means connected between said circuit junction and tap when its normally open contact is closed,
- (b) energization of the inductor means in said auxiliary circuit causing said member to move in the reverse direction back to its neutral position, (G) the values of said capacitance means, resistance means, first and second inductor means, output terminals, and tap being correlated so that
- (a) said capacitance and inductor means are resonant in said operating and auxiliary circuits, and
- (b) the potential of said circuit junction and tap are substantially equal when a relay energizing tap is closed, but
- (c) the potential of said circuit junction and tap are different by the predetermined operating voltage of said member when said relay energizing taps are open and a normally open tap is closed, (H) whereby,
- (a) said predetermined operating voltage is applied to the inductor means in the operating circuit when a relay energizing contact is open, but
- (b) said predetermined operating voltage is applied to the inductor means in the auxiliary circuit only when a normally open contact is closed and the relay energizing contacts are open.

2. In a time delay control system:
(A) an autotransformer having a pair of output terminals and a tap at a potential halfway between that at said output terminals,
(B) a time delay relay having main control contacts for energization of an external circuit and a motor having first and second windings respectively causing same to move away from a neutral position in first and second reverse directions when a predetermined operating voltage is applied thereto,
- (a) said main control contacts being actuated by said motor after a predetermined time of movement in either direction from said neutral position,
- (b) a normally closed contact in series with one end of each winding,
- (c) a normally open contact also in series with said one end of each winding, (C) a pair of relay energizing contacts for selectively connecting said one end of each winding to one of said output terminals through their associated normally closed contacts,
- (a) means associated with said motor operative to open the normally closed contact and close the normally open contact associated with one winding upon energization of the other winding by a relay energizing contact,
- (b) circuit means connecting said tap to said one end of each winding when its associated normally open contact is closed, (D) a circuit junction point,
- (a) a capacitor connected between said one output terminal and said junction point,
- (b) a resistor connected between the other output terminal and said junction point, and
- (c) the other end of each winding being connected to said junction point, (E) an operating circuit comprising
- (a) one winding connected in parallel with said capacitor between said junction point and said one terminal when its associated energizing contact and normally closed contact are both closed,
- (b) and the parallel-connected capacitor and winding being connected to the other output terminal through said resistor,
- (c) thereby to cause said motor to move away from its neutral position in one direction to close a main operating contact, (F) an auxiliary runback circuit comprising
- (a) the other winding connected between said junction point and tap when its normally open contact is closed,
- (b) energization of the winding in said auxiliary circuit causing said motor to move in the reverse direction back to its neutral position, (G) the values of said capacitor, resistor, first and second windings, output terminals, and tap being correlated so that
- (a) said capacitor and windings are resonant in said operating and auxiliary circuits, and
- (b) the potential of said junction point and tap are substantially equal when a relay energizing tap is closed, but
- (c) the potential of said junction point and tap are different by the predetermined operating voltage of said motor when said relay energizing taps are open and a normally open tap is closed, (H) whereby,
- (a) said predetermined operating voltage is applied to the winding in the operating circuit when a relay energizing contact is open, but
- (b) said predetermined operating voltage is applied to the winding in the auxiliary circuit only when a normally open contact is closed and the relay energizing contacts are open.

3. In a time delay control system:
(A) a voltage supplying transformer having a pair of output terminals and a tap at a potential intermediate that at said output terminals,
(B) a time delay relay having main control contacts for energization of an external circuit and a motor having first and second windings respectively causing same to move away from a neutral position in first and second reverse directions when a predetermined operating voltage is applied thereto,
- (a) said main control contacts being actuated by said motor after a predetermined time of movement in either direction from said neutral position,
  (b) a normally closed contact in series with one end of each winding,
  (c) a normally open contact also in series with said one end of each winding,
(C) a pair of relay energizing contacts fore selectively connecting said one end of each winding to one of said output terminals through their associated normally closed contacts,
  (a) means associated with said motor operative to open the normally closed contact and close the normally open contact associated with one winding upon energization of the other winding by a relay energizing contact,
  (b) circuit means connecting said tap to said one end of each winding when its associated normally open contact is closed,
(D) a circuit junction point,
  (a) capacitance means connected between said one output terminal and said junction point,
  (b) resistance means connected between the other output terminal and said junction point, and
  (c) the other end of each winding being connected to said junction point,
(E) an operating circuit comprising
  (a) one winding connected in parallel with said capacitance means between said junction point and said one terminal when its associated energizing contact and normally closed contact are both closed,
  (b) and the parallel-connected capacitance and winding being connected to the other output terminal through said resistance means,
  (c) thereby to cause said motor to move away from its neutral position in one direction to close a main operating contact,
(F) an auxiliary runback circuit comprising
  (a) the other winding connected between said junction point and tap when its normally open contact is closed,
  (b) energization of the winding in said auxiliary circuit causing said motor to move in the reverse direction back to its neutral position,
(G) the values of said capacitance means, resistance means, first and second windings, output terminals, and tap being correlated so that
  (a) said capacitance means and windings are resonant in said operating and auxiliary circuits, and
  (b) the potential of said junction point and tap are substantially equal when a relay energizing tap is closed, but
  (c) the potential of said junction point and tap are different by the predetermined operating voltage of said motor when said relay energizing taps are open and a normally open tap is closed,
(H) whereby,
  (a) said predetermined operating voltage is applied to the winding in the operating circuit when a relay energizing contact is open, but
  (b) said predetermined operating voltage is applied to the winding in the auxiliary circuit only when a normally open contact is closed and the relay energizing contacts are open.

4. In a time delay control system:
(A) an autotransformer having a pair of output terminals and a tap at a potential intermediate that at said output terminals,
(B) a time delay relay having main control contacts for energization of an external circuit and a member movable from a neutral position in first and second reverse directions,
  (a) said main control contacts being actuated by said member after a predetermined time of movement in either direction from said neutral position,
  (b) first and second inductor means respectively causing movement of said member in said first and second reverse directions when a predetermined operating voltage is applied thereto,
  (c) a normally closed contact in series with one end of each inductor means,
  (d) a normally open contact also in series with said one end of each inductor means,
(C) a pair of relay energizing contacts for selectively connecting said one end of each inductor means to one of said output terminals through their associated normally closed contacts,
  (a) said one output terminal being grounded,
  (b) means associated with said member operative to open the normally closed contact and close the normally open contact associated with one inductor means upon energization of the other inductor means by a relay energizing contact,
  (c) circuit means connecting said tap to said one end of each inductor means when its associated normally open contact is closed,
(D) a circuit junction point,
  (a) capacitance means connected between said one output terminal and said junction point,
  (b) resistance means connected between the other output terminal and said junction point, and
  (c) the other end of each inductor means being connected to said junction point,
(E) an operating circuit comprising
  (a) one inductor means connected in parallel with said capacitance means between said junction point and said one terminal when its associated energizing contact and normally closed contact are both closed,
  (b) and the parallel-connected capacitance and inductor means being connected to the other output terminal through said resistance means,
  (c) thereby to cause said member to move away from its neutral position in one direction to close a main operating contact,
(F) an auxiliary runback circuit comprising
  (a) the other inductor means connected between said junction point and tap when its normally open contact is closed,
  (b) energization of the inductor means in said auxiliary circuit causing said member to move in the reverse direction back to its neutral position,
(G) the values of said capacitance means, resistance means, first and second inductor means, output terminals, and tap being correlated so that
  (a) said capacitance and inductor means are resonant in said operating and auxiliary circuits, and
  (b) the potential of said junction point and tap are substantially equal when a relay energizing tap is closed, but
  (c) the potential of said junction point and tap are different by the predetermined operating voltage of said member when said relay energizing taps are open and a normally open tap is closed,
(H) whereby,
  (a) said predetermined operating voltage is applied to the inductor means in the operating circuit when a relay energizing contact is open, but
  (b) said predetermined operating voltage is applied to the inductor means in the auxiliary circuit only when a normally open contact is closed and the relay energizing contacts are open.

5. A time delay control system for an automatic regulator comprising, in combination, a supply transformer winding having a pair of main output terminals and an intermediate tap output terminal, a capacitor and a resistor permanently connected in series between said main output terminals, a reversible motor driven time delay relay having separate forward and reverse direction of operation controlling inductive windings each with a terminal permanently connected to the junction of said capacitor and resistor, a regulating relay for selectively connecting said direction of operation controlling windings in parallel with said capacitor, said direction of operation control windings and said capacitor being substantially tuned for parallel resonance, and separate pairs of runback controlling contacts on said relay for selectively connecting said direction of operation controlling winding to said intermediate tap output terminal, the position of said intermediate tap being such that its voltage is substantially equal to the voltage of the junction between said capacitor and resistor when a direction of operation controlling winding is connected in parallel with said capacitor.

6. A time delay control system for an automatic regulator comprising, in combination, an autotransformer winding having a grounded common input and output end terminal and two additional output terminals, one of which is an intermediate tap on said winding and the other of which is the other end terminal of said winding, a capacitor and a resistor permanently connected in series between said end terminals with said capacitor connected to said grounded common autotransformer winding terminal, a reversible motor driven time delay relay having a neutral position, said relay having two pairs of operating circuit contacts both of which are closed when said relay is in its neutral position and a different one of which is opened when said relay leaves its neutral position depending upon its direction of operation, said relay having two pairs of auxiliary runback contacts both of which are open when said relay is in its neutral position and a different one of which is closed when said relay leaves its neutral position depending on its direction of operation, separate forward and reverse motor direction controlling windings on said relay, said windings each having a terminal permanently connected to the junction between said serially connected capacitor and resistor, a regulating relay having a movable common contact permanently connected to said grounded common autotransformer winding terminal and a pair of fixed contacts selectively engageable by said movable contact, said fixed contacts being connected respectively to the remaining terminals of said motor driven controlling windings through the respective pairs of operating circuit contacts on said relay which remain closed for the direction of operation produced by the respective direction controlling windings whereby operation of said regulating relay selectively connects said direction controlling windings in parallel with said capacitor, said windings and capacitor being substantially tuned for parallel resonance, said remaining terminals of the motor controlling windings also being connected to said intermediate tap through respective pairs of said auxiliary runback controlling contacts, the position of said intermediate tap being such that its voltage is substantially equal to the voltage of the junction between said capacitor and resistor when a direction of operation controlling winding is connected in parallel with said capacitor.

References Cited by the Examiner
UNITED STATES PATENTS
2,779,899   1/57   Lennox _____ 323—43.5 X LLOYD McCOLLUM, *Primary Examiner.*